2,926,145

PHOSPHONO - POLYESTERS FROM 1,4 - CYCLOHEXANEDIMETHANOL AND POLYESTER-URETHANES THEREFROM

Richard L. McConnell and Harry W. Coover, Jr., Kingsport, Tenn., assignors to Eastman Kodak Company, Rochester, N.Y., a corporation of New Jersey No Drawing. Application September 11, 1957
Serial No. 683,202

18 Claims. (Cl. 260—2)

This invention is concerned with certain linear phosphono polyesters, also referred to as polymeric organophosphonates. This invention provides a process for producing such polymers which are viscous liquids like oil and are useful as flameproofing agents for fabrics, etc. This invention also relates to polyesterurethanes which are high melting solid polymers useful in forming excellent fibers and film of exceptional resistance to fire.

The linear phosphono polyesters of this invention are in a sense analogous to the phosphono polyesters set forth in our copending application Ser. No. 540,156, filed on October 12, 1955, now abandoned. The phosphono polyesters described herein are derived from a particularly valuable alicyclic glycol which serves to provide distinctly different characteristics in the polyesters and to increase their thermal and hydrolytic stability in the preparation of polyesterurethanes. This unusually valuable glycol is 1,4-cyclohexane-dimethanol.

The linear phosphono polyesters of this invention could not be produced by methods known in the prior art. The problem was to find some way by which an organic phosphonyl dichloride could be reacted with an alicyclic glycol so as to produce a useful polyester.

The usual phosphono polyester formation is well known in the art to be advantageously conducted at temperatures on the order of 200°–300° C. although the broader ranges sometimes mentioned refer to temperatures approaching a minimum as low as 100° C. when preparing polyesters of the type with which this invention is concerned. However, those familiar with this field have come to believe that temperatures well above 150° C. are needed to accomplish the condensation in a reasonable period of time.

The preparation of phosphorus-containing polyesters by condensation of a phosphonyl or phosphoryl dichloride with an aromatic dihydroxy compound such as hydroquinone or dihydroxy biphenyl is well known as shown in U.S. Patents 2,682,521 and 2,682,522. In the preparation of such aromatic polyesters the condensation proceeded readily in accordance with usual practice by heating the reactant mixture at temperatures of 150° C. or higher. Temperatures of as much as 200–300° C. were commonly used without appreciable side reactions. The polyester formation thereby obtained is illustrated by the following equation showing the type of recurring structural unit resulting from the polymerization:

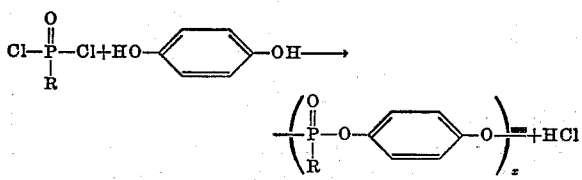

According to the prior art procedures, the HCl which formed caused no significant side reactions when dihydric phenolic compounds were employed. However, the use of aliphatic including alicyclic glycols failed to produce polymers apparently because a chain-terminating side reaction was experienced in the presence of HCl. It would appear that this trouble could be solved only by various involved expedients. Reducing the temperature would appear to favor further retention of HCl in the reaction mixture.

Quite unexpectedly it was found that by employing temperatures at or below 100° C., e.g., 0°–100° C. the polymerization was accomplished expeditiously producing transparent viscous oils possessing excellent characteristics.

Moreover, it was also surprising to find that these viscous liquid phosphono polyesters can be reacted with diisocyanates to product high melting solid polyurethanes which can be formed into useful fibers and films from which flame resistant fabrics, wrapping materials and photographic film base can be advantageously fabricated by melt extrusion or solution extrusion techniques well known in the art.

It is accordingly an object to provide new phosphorus-containing polyesters by the reaction of 1,4-cyclohexanedimethanol with phosphonyl dichlorides, which phosphono polyesters were not obtainable by the methods commonly employed for such polyester formation.

Another object is to provide novel viscous liquid phosphono polyesters suitable for treating fibers and fabrics so as to improve flame resistance and to impart other valuable characteristics desirable in the fabric manufacturing industry such as high thermal and hydrolytic stability.

A further object is to provide polyesterurethanes of superior physical and chemical characteristics including great stability to hydrolysis and heat degradation and possessing a high degree of flame resistance together with the ability to form fibers and films of especially valuable utility in those applications where heat and potential fire hazards exist as in industrial workers' garments, children's party costumes, motion picture film base, lantern lenses, etc.

Other objects are apparent from the entire description and claims herein.

These and other objects are accomplished by means of this invention wherein one embodiment provides a linear phosphono polyester consisting predominantly of recurring phosphono-ester structural units having the following formula:

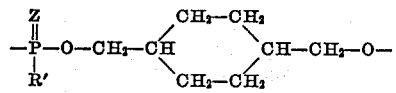

wherein Z represents an atom selected from the group consisting of oxygen and sulfur, and R' represents a radical as defined below.

The phosphono-ester structural units having the above formula are designated hereinbelow by R''.

Another embodiment of this invention provides a method for making a linear phosphono polyester which comprises reacting 1,4-cyclohexanedimethanol with a phosphonyl dichloride having the formula

wherein Z represents an atom selected from the group consisting of oxygen and sulfur, and R' represents a radical selected from the group consisting of alkyl, bromoalkyl, chloroalkyl, alkylamido and dialkylamido radicals wherein the alkyl substitutents contain from 1 to 8 carbon atoms, cyclohexyl, phenyl, benzyl, tolyl and zylyl, while maintaining the reaction mixture at a temperature in the range of about 0° C. to about 100° C. until substantially all of the hydrogen chloride by-product has been removed.

This method requires careful control to keep the temperature from going much above 100° C. which is substantially the upper limit. By conducting the reaction within the preferred range as specified there is achieved a smooth efficient reaction which may be conducted in the presence of inert organic solvents such as petroleum fractions like heptane, nonane, chlorinated hydrocarbons such as carbon tetrachloride, chloroform, the freons, etc., benzene, toluene, xylene, acetone, methyl ethyl ketone, diethyl ether, and other types of solvents. For practical purposes, it is also necessary to externally cool the reaction vessel and to bring the two reactants into contact on a carefully controlled basis. Agitation is essential in order to minimize development of localized excessive temperatures.

The removal of hydrogen chloride as it is evolved can be advantageously facilitated by sweeping an inert gas such as nitrogen, argon, carbon dioxide or the like through the reaction vessel. This can also be done at reduced pressure. It can also be done by having in the reaction mixture a tertiary organic base, ammonia or the like sufficient to react with the hydrogen chloride. Combinations of such means can be employed. Moreover, the reaction mixture can be washed with dilute aqueous bases such as sodium carbonate, potassium hydroxide, ammonium hydroxide, sodium bicarbonate, etc. Bubbling the inert gas through the reaction mixture is a useful technique.

It is preferred to add the phosphonyl dichloride to the glycol slowly so as to keep the reaction under proper temperature control and to facilitate producing a polyester especially useful in making polyesterurethanes.

In an especially preferred embodiment of the method of this aspect of the invention no solvent is employed and an inert atmosphere and reduced pressure below 50 mm. of Hg is used toward the end of the reaction to facilitate removal of hydrogen chloride. Most advantageously the final pressure is below 2 mm. of Hg.

In general, the above method can be conducted with an excess of either reactant although ease of ultimate purification favors approximately equimolar proportions. Advantageously, a slight overall excess of the glycol can be employed (1% to 5% excess by weight). This facilitates the formation of phosphono polyesters having a maximum content of terminal hydroxy groups. This characteristic favors the most advantageous properties in the polyesterurethanes which can be produced by reacting these phosphono polyesters with diisocyanates.

The glycol which is employed includes either the cis or the trans isomer or a mixture thereof of 1,4-cyclohexanedimethanol. Other isomers can also be present in minor amounts. Unless otherwise specified the glycol employed is a mixture of cis and trans isomers. In addition, minor amounts of any of the alkylene glycols containing 2–10 carbon atoms can be employed in practicing the invention, including both the straight and branched chain glycols.

The glycol can be reacted with any of the above-defined phosphonyl dichlorides such as 2-ethylhexyl phosphonyl dichloride,
3,3-dimethyl pentyl phosphonyl dichloride,
phenyl phosphonyldichloride,
cyclohexyl phosphonyldichloride,
benzyl phosphonyldichloride,
p-tolyl phosphonyldichloride,
phenyl thiophosphonyldichloride,
tert. butyl thiophosphonyldichloride,
methyl phosphonyldichloride,
decyl phosphonyldichloride, etc.

Equivalent compounds are shown in the examples below and other compounds which may possess other inert substituents which do not have any substantial adverse effect upon the chemical and physical properties of the phosphono polyester being produced may be used.

Another important embodiment of this invention relates to products formed by reacting hydroxyl terminated phosphono polyesters provided by this invention with diisocyanates. Thus, this embodiment provides a highly polymeric high melting fiber-forming polyesterurethane consisting predominantly of macromolecules containing the following structural units:

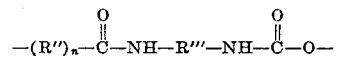

wherein R" is a phosphono-ester structural unit having the following formula:

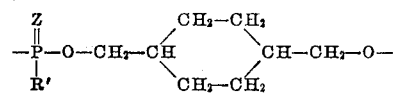

wherein Z and R' have already been defined, R'" represents the radical remaining after deleting the isocyanate groups from a hydrocarbon diisocyanate containing from 6 to 12 carbon atoms, and $n$ represents a positive integer.

As is apparent hereinabove, $n$ is a value such that the corresponding linear phosphono polyester is ordinarily a viscous liquid. Thus, $n$ may range from 3–4 to 10–20 or higher.

These polyesterurethanes are especially valuable for preparing fibers useful for the manufacture of both woven and unwoven fabrics which are especially characterized by exceptional resistance to burning. Moreover, such fabrics possess other value qualities required for good fabrics in general, i.e., hydrolytic stability and high resistance to thermal degradation caused by ironing or other exposure to elevated temperatures.

The details as to the preparation of such fiber forming polyesterurethanes are well known in the art as illustrated in numerous patents and published articles, for example U.S. Patent No. 2,511,544. Generally it is preferred to use an inert solvent such as xylene, toluene, dioxane, methyl ethyl ketone, acetone, chlorobenzene, various freons, etc. The condensation reaction is more rapid at elevated temperatures such as 30°–50° C. or higher. The solvent or mixture of solvents can be selected for whatever temperature is deemed preferable. The polymer generally separates as a precipitate from the solvent and can be heated to remove residual solvent and to further increase the molecular weight, as by heating in vacuo. Condensing agents are unnecessary although they can be employed in some cases if desired. The polymer can be melt extruded to form fibers or film which can be stretched to orient the molecules and then heat set. However, such treatment may not be necessary for some applications as in making unwoven fabrics or films designed for use as wrapping materials. As previously mentioned, the ultimate products are characterized by valuable general properties such as softening points above 150° C. and are most particularly distinguished by high resistance to burning, heat degradation and hydrolysis.

An embodiment of this invention provides thermoplastic fibers softening at 150°–300° C. formed from at least one polyesterurethane consisting predominantly of the macromolecules defined above.

This invention can be further illustrated by the following examples of preferred embodiments although it will be understood that these examples are included merely for purposes of illustration and are not intended to limit the scope of the invention unless otherwise specifically indicated:

*Example 1.—Polyphosphonate derived from phenlyphosphonyl dichloride and cyclohexanedimethanol*

Cyclohexanedimethanol (28.8 g., 0.2 mole) was melted and placed in a 100 ml. reaction flask. Nitrogen was passed through the flask and phenylphosphonyl dichloride (39.0 g., 0.2 mole) was added dropwise with stirring. The reaction is exothermic, and the temperature rose to 60° C. At this point the reaction flask was cooled externally with cold water, and the reaction temperature was maintained at 40–50° C. while the rest of the phenylphosphonyl dichloride was added dropwise. The total time required to add the phenylphosphonyl dichloride was about 30 minutes. The reaction mixture was stirred for an additional 30 minutes and then heated on the steam bath with stirring for 2½ hours. During the last hour of the reaction, the reaction mixture was placed under reduced pressure (1–2 mm.) to remove all of the liberated hydrogen chloride. This polyphosphonate is a colorless, viscous oil at 90° C. but is too viscous to pour at 25° C. It will dissolve slowly in acetone, dimethylformamide, and hot benzene.

A white solid polymer was obtained by reacting the above polymer with meta-tolylene diisocyanate using a triethylamine catalyst. This solid polymer could be spun into fibers which were quite flame resistant.

*Example 2.—Polyphosphonate derived by chloromethylphosphonyl dichloride and cyclohexanedimethanol*

This polyester was prepared from chloromethylphosphonyl dichloride (67 g., 0.4 mole) and cyclohexanedimethanol (57.6 g., 0.4 mole) according to the procedure of Example 1.

*Example 3.—Polyphosphonate derived from heptanephosphonyl dichloride and cyclohexanedimethanol*

Cyclohexanedimethanol (28.2 g., 0.2 mole) and pyridine (15.8 g., 0.2 mole) were placed in 400 ml. of 1,1,1-trichloroethane and stirred while heptanephosphonyl dichloride (43.4 g., 0.2 mole) was added dropwise. The reaction is exothermic, and the solvent was allowed to reflux gently. The reaction mixture was stirred for 5 hours and then the pyridine hydrochloride was filtered off. After removing the solvent, the product remained as a very viscous, light yellow oil.

*Example 4.—Polyphosphonate derived from cyclohexylphosphonyl dichloride and cyclohexanedimethanol*

This polyester was prepared from cyclohexylphosphonyl dichloride (40.2 g., 0.2 mole) and cyclohexanedimethanol (28.8 g., 0.2 mole) according to the procedure of Example 1.

*Example 5.—Polyphosphonate derived from dimethylamidophosphonyl dichloride and cyclohexanedimethanol*

This polyester was prepared from dimethylamidophosphonyl dichloride (32.4 g., 0.2 mole), cyclohexanedimethanol (28.8 g., 0.2 mole) and pyridine (15.8 g., 0.2 mole) according to the procedure of Example 3 except that benzene was used as the solvent rather than 1,1,1-trichloroethane.

*Example 6.—Polyphosphonate derived from phenylphosphonothioic dichloride and cyclohexanedimethanol*

This polyester was prepared from phenylphosphonothioic dichloride (42.2 g., 0.2 mole), cyclohexanedimethanol (28.8 g., 0.2 mole) and pyridine (15.8 g., 0.2 mole) according to the procedure of Example 3.

The polymeric organophosphonates produced in Examples 2–6 can also be reacted with diisocyanates to produce solid polymers.

*Example 7.—Polyesterurethanes*

The examples given above refer to polyesterurethanes prepared from the linear phosphono polyesters of this invention prepared by the condensation of equimolecular quantities of reactants. In these examples the original polyester contains some phosphonic as well as hydroxyl end groups. By using slightly less than an equimolecular quantity of the phosphonyldichloride there can be achieved an even higher proportion of hydroxyl end groups which result is especially advantageous for preparing polyesterurethanes.

The procedure of Example 1 was repeated except for the employment of only 38 g. instead of 39 g. of the phosphonyldichloride. Ten parts by weight of the transparent viscous material produced was slowly added to 30 parts of dioxane in which there had been dissolved 3 parts of tetramethylene diisocyanate. The temperature was controlled by the boiling point of the solvent. A linear highly polymeric product was obtained with only a small degree of cross-linking whereby the polymer was thermoplastic and could be melt spun or extruded.

The procedure of Example 3 was repeated except that only 42.5 g. of the phosphonyldichloride was used and the solvent was not removed after the pyridine hydrochloride had been filtered off. This solution was added slowly to a solution of 15 g. of hexamethylene diisocyanate dissolved in 1,1,1-trichloroethane. The polyesterurethane was separated by filtration, died in vacuo at 150° C. and formed into fibers and film by melt extrusion techniques.

*Example 8.—Related polyesters and polyesterurethanes*

Although this invention is primarily directed to those products derived from 1,4-cyclohexanedimethanol, certain other diols can be similarly employed although it is obvious that they are not equivalents; such diols are shown by the following formulas wherein the carbocyclic rings are all fully saturated (except as indicated):

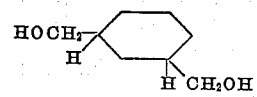

Decahydro-1,4,5,8-dimethano-2,6 (or 2,7) -naphthalenedimethanol

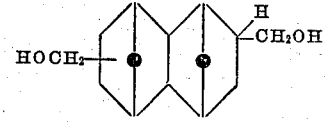

2,5- (or 2,6) -norcamphanedimethanol

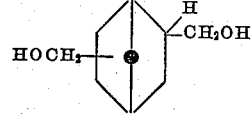

2,7-norcamphanediol

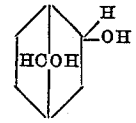

2,2,4,4-tetramethyl-1,3-cyclobutanediol

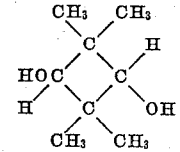

Hydrogenated bis phenol A

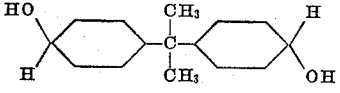

2,2'-(4,4'-isopropylidenediphenoxy)diethanol

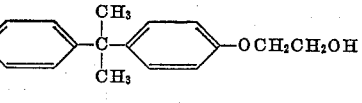

2,3,5,6-tetramethyl-1,4-cyclohexanediol

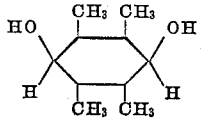

Other diols which can also be employed but which are still less closely related to 1,4-cyclohexanedimethanol are 3-hydroxy-2,2-dimethylpropyl 2,2-dimethylhydracrylate, $$HOCH_2C(CH_3)_2COOCH_2C(CH_3)_2CH_2OH$$

and the polyethylene glycol Carbowaxes (available from carbide and carbon), $HO(CH_2CH_2O)_nH$ where $n$ ranges from about 4 to about 140. The following example is illustrative:

*Polyphosphonate derived from phenylphosphonyl dichloride and 2,5-(or 2,6)norcamphanedimethanol*

This polymer was prepared from 2,5-(or 2,6)norcamphanedimethanol (164 g., 1.05 moles) and phenylphosphonyl dichloride (194 g., 1.0 mole) according to the procedure of Example 1.

A white solid polymer was obtained by reacting this polyphosphonate with hexamethylene diisocyanate according to the procedure discussed under Example 7.

Similar results were obtained using
1,3-cyclohexanedimethanol,
decahydro-1,4,5,8-dimethano-2,6 - (or 2,7)naphthalenedimethanol,
2,7-norcamphanediol,
3-hydroxy-2,2-dimethylpropyl 2,2-dimethylhydracrylate,
2,2,4,4-tetramethyl-1,3-cyclobutanediol, and
polyethylene glycol 200 (a Carbowax from Carbide and Carbon Chemicals Company).

Other polyesterurethanes having properties as described above can be similarly prepared and formed into fibers and film useful in textiles, wrapping materials, photographic film base for either black and white or color emulsions, etc. Such film base is especially valuable for motion picture film which is to be subjected to extremely high temperatures where thermal degradation and fire hazards are a serious consideration.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A linear phosphono polyester consisting predominantly of recurring phosphono-ester structural units having the following formula wherein the right hand side of one unit is connected to the left hand side of the next unit and the ends of each molecule composed of such units are predominantly terminated with —OH groups:

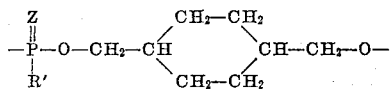

wherein Z represents an atom selected from the group consisting of oxygen and sulfur, R' represents a radical selected from the group consisting of alkyl, chloroalkyl, bromoalkyl, alkylamido and dialkylamido radicals wherein the alkyl substituents contain from 1 to 8 carbon atoms, cyclohexyl, phenyl, benzyl, tolyl, and xylyl.

2. A polyester as defined in claim 1 wherein Z is oxygen and R' is a phenyl radical.

3. A polyester as defined in claim 1 wherein Z is oxygen and R' is a chloromethyl radical.

4. A polyester as defined in claim 1 wherein Z is oxygen and R' is a cyclohexyl radical.

5. A polyester as defined in claim 1 wherein Z is oxygen and R' is a dimethylamido radical.

6. A polyester as defined in claim 1 wherein Z is sulfur and R' is a phenyl radical.

7. A method for making a linear phosphono polyester which comprises reacting 1,4-cyclohexanedimethanol with a phosphonyl dichloride having the formula

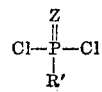

wherein Z represents an atom selected from the group consisting of oxygen and sulfur, and R' represents a radical selected from the group consisting of alkyl, chloroalkyl, bromoalkyl, alkylamido and dialkylamido radicals wherein each alkyl substituent contains from 1 to 8 carbon atoms, cyclohexyl, phenyl, benzyl, tolyl and xylyl, while maintaining the reaction mixture at a temperature in the range of about 0° C. to about 100° C. until substantially all of the hydrogen chloride byproduct has been removed whereby a polyester is obtained consisting predominantly of recurring phosphono-ester structural units having the following formula wherein the right hand side of one unit is connected to the left hand side of the next unit and the ends of each molecule composed of such units are predominantly terminated with —OH groups:

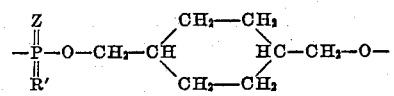

wherein Z and R' have been defined above.

8. A method as defined in claim 7 wherein Z is oxygen and R' is a phenyl radical.

9. A method as defined in claim 7 wherein Z is oxygen and R' is a chloromethyl radical.

10. A method as defined in claim 7 wherein Z is oxygen and R' is a cyclohexyl radical.

11. A method as defined in claim 7 wherein Z is oxygen and R' is a dimethylamido radical.

12. A method as defined in claim 7 wherein Z is sulfur and R' is a phenyl radical.

13. A highly polymeric high melting fiber forming polyesterurethane consisting predominantly of macromolecules containing the following structural units wherein the right hand side of one unit is connected to the left hand side of the next unit both for each entire unit and for each unit designated R":

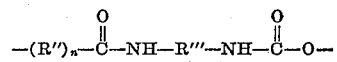

wherein R" is a phosphono-ester structural unit having the following formula:

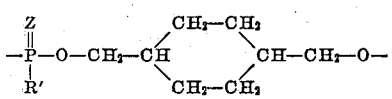

wherein Z and R' have already been defined, R'" represents the radical remaining after deleting the isocyanate groups from a hydrocarbon diisocyanate containing from 6 to 12 carbon atoms, and $n$ represents a positive integer.

14. A polyesterurethane as defined in claim 13 wherein Z is oxygen, R' is a phenyl radical and R'" is a meta-tolylene radical.

15. A polyesterurethane as defined in claim 13 wherein Z is oxygen, R' is a phenyl radical and R'" is a tetramethylene radical.

16 A polyesterurethane as defined in claim 13 wherein Z is oxygen, R' is a heptyl radical and R'" is a hexamethylene radical 17. A thermoplastic fiber softening within the range of 150°–300° C. formed from a polyesterurethane as defined in claim 13.

18. A thermoplastic film softening within the range of 150°–300° C. formed from a polyesterurethane as defined in claim 13.

References Cited in the file of this patent

UNITED STATES PATENTS

| | | |
|---|---|---|
| 2,382,622 | Fon Toy | Aug. 14, 1945 |
| 2,601,075 | Wicklatz | June 17, 1952 |
| 2,682,522 | Coover | June 29, 1954 |
| 2,691,566 | Kvalnes | Oct. 12, 1954 |
| 2,716,101 | Coover | Aug. 23, 1955 |